United States Patent
Buzby et al.

(10) Patent No.: US 6,760,811 B2
(45) Date of Patent: Jul. 6, 2004

(54) GATEWORD ACQUISITION IN A MULTIPROCESSOR WRITE-INTO-CACHE ENVIRONMENT

(75) Inventors: Wayne R. Buzby, Phoenix, AZ (US); Charles P. Ryan, Phoenix, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 202 days.

(21) Appl. No.: 10/219,644

(22) Filed: Aug. 15, 2002

(65) Prior Publication Data

US 2004/0034741 A1 Feb. 19, 2004

(51) Int. Cl.$^7$ .............................................. G06F 12/00
(52) U.S. Cl. ...................... 711/130; 711/118; 711/119; 711/120; 711/121; 711/122; 711/147
(58) Field of Search ................................. 711/118, 119, 711/121, 122, 128, 130, 158, 147, 151

(56) References Cited

U.S. PATENT DOCUMENTS

| | | | | |
|---|---|---|---|---|
| 5,339,443 A | * | 8/1994 | Lockwood | 710/244 |
| 5,581,782 A | * | 12/1996 | Sarangdhar et al. | 710/119 |
| 5,826,045 A | * | 10/1998 | Reams | 710/107 |
| 6,055,605 A | * | 4/2000 | Sharma et al. | 711/130 |
| 6,163,831 A | * | 12/2000 | Kermani | 711/150 |
| 6,314,499 B1 | * | 11/2001 | Kermani | 711/147 |
| 6,401,176 B1 | * | 6/2002 | Fadavi-Ardekani et al. | 711/151 |
| 6,484,272 B1 | * | 11/2002 | Egolf et al. | 714/30 |

* cited by examiner

Primary Examiner—Donald Sparks
Assistant Examiner—Ngoc Dinh
(74) Attorney, Agent, or Firm—James H. Phillips

(57) ABSTRACT

In a multiprocessor data processing system including: a memory, first and second shared caches, a system bus coupling the memory and the shared caches, first, second, third and fourth processors having, respectively, first, second, third and fourth private caches with the first and second private caches being coupled to the first shared cache, and the third and fourth private caches being coupled to the second shared cache, gateword hogging is prevented by providing a gate control flag in each processor. Priority is established for a processor to next acquire ownership of the gate control word by: broadcasting a "set gate control flag" command to all processors such that setting the gate control flags establishes delays during which ownership of the gate control word will not be requested by another processor for predetermined periods established in each processor. Optionally, the processor so acquiring ownership broadcasts a "reset gate control flag" command to all processors when it has acquired ownership of the gate control word.

16 Claims, 3 Drawing Sheets

GATEWORD ACQUISITION IN A MULTIPROCESSOR WRITE-INTO-CACHE ENVIRONMENT

FIELD OF THE INVENTION

This invention relates to the art of multiprocessing and, more particularly, to method and apparatus for controlling gateword acquisition in a multiprocessor write-into-cache environment. More specifically yet, this invention relates to preventing a "hogging" condition in which a given processor is unable to gain timely acquire a gateword which is controlling access to a process or data set.

BACKGROUND OF THE INVENTION

In a multiprocessor system having a write-into-cache architecture, gatewords are used in a software controlled process to prevent more than one processor from executing common code or accessing shared data at the same time. A unique gateword that is assigned to a given process or data set is tested to assure that no other processor is currently executing or accessing the information a given processor is requesting. This procedure prevents a detrimental activity from occurring when a processor changes data at the same time another processor is using it, a condition commonly labeled as "processes stepping on each other".

An operating system for a multiprocessor environment can have several processes that are common code elements used by all processors. (Similarly, several processes may share common data sets used by all processor.) For example, a dispatcher process may be responsible for starting or re-dispatching all processes. The dispatcher code is protected by a gateword that is heavily accessed by all processors. In a "write-into-cache" cache architecture, the gateword is siphoned from one processor to another while testing for the gateword to be opened (available).

The write-into-cache architecture increases the amount of data siphoning between caches. The siphoning process incurs significant delays when the copied data must be siphoned through multiple levels of cache. Thus, in modern multiprocessing systems, not all processors are equal when it comes to data siphoning delays. The more cache mechanisms given siphoned data must pass through, the longer it will take the data to arrive at the requesting processor.

A process decision cannot be made until the data arrives and can be tested. The delays can be sufficiently excessive as to prevent a processor with the longest siphon delays in a given condition from ever acquiring the relevant gateword before another processor has overwritten (and thus closed) it. This undesirable result is commonly called "hogging". (Cache interface priorities play a part in access delays, but are a necessary requirement in hardware design to sequence the access commands one at a time for proper data and status updating within the details of the cache design.)

Software systems have typically relied on hardware to mediate the gateword access controls using a read-alter-rewrite method of access. Specific gate handling instructions used this mechanism which was satisfactory when processors in a multiprocessor system had substantially the same access times within the context of processor clock speeds. As hardware designs became more complex and processor speeds increased, it also became more difficult to attain the interface speeds necessary to handle the gateword access priority without a system performance penalty. The responsibility for access to heavily used gatewords has gradually become more dependent on software mechanisms as software designers become increasingly aware of the problems that occur as a result of the hogging effect.

Most software techniques employed to handle the hogging problem are of fixed delay types that will always delay access to a gateword whether a delay is required or not. Fixed delay techniques significantly reduce system performance. This type of software technique must be tuned to the system architecture and may even have to be tuned to various gates within the operating system. Accordingly, it would be highly desirable to provide hardware assistance, in the form of additional instructions, to assist in effecting software handling of gateword control in a complex multiple processor system with a write-into-cache architecture. The present invention achieves this objective in a relatively simple and highly effective manner.

SUMMARY OF THE INVENTION

This and other objects of the invention are achieved by providing, in a multiprocessor data processing system including a memory; at least first and second shared caches; a system bus coupling the memory and the first and second shared caches; at least first, second, third and fourth processors having, respectively, first, second, third and fourth private caches with the first and second private caches being coupled to the first shared cache, and the third and fourth private caches being coupled to the second shared cache; preventing hogging of ownership of a gate control word by providing a gate control flag in each of the processors; and establishing priority for another processor to next acquire ownership of the gate control word by: broadcasting from the another processor a "set gate control flag" command to all processors such that setting the gate control flags establishes delays during which ownership of the gate control word will not be requested by a processor for predetermined periods established in each processor; and establishing in the another processor a shorter predetermined period than established in all other processors such that the another processor will acquire ownership of the gate control word when the one processor relinquishes ownership. Optionally, the another processor broadcasts a "reset gate control flag" command to all processors when it has acquired ownership of the gate control word.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
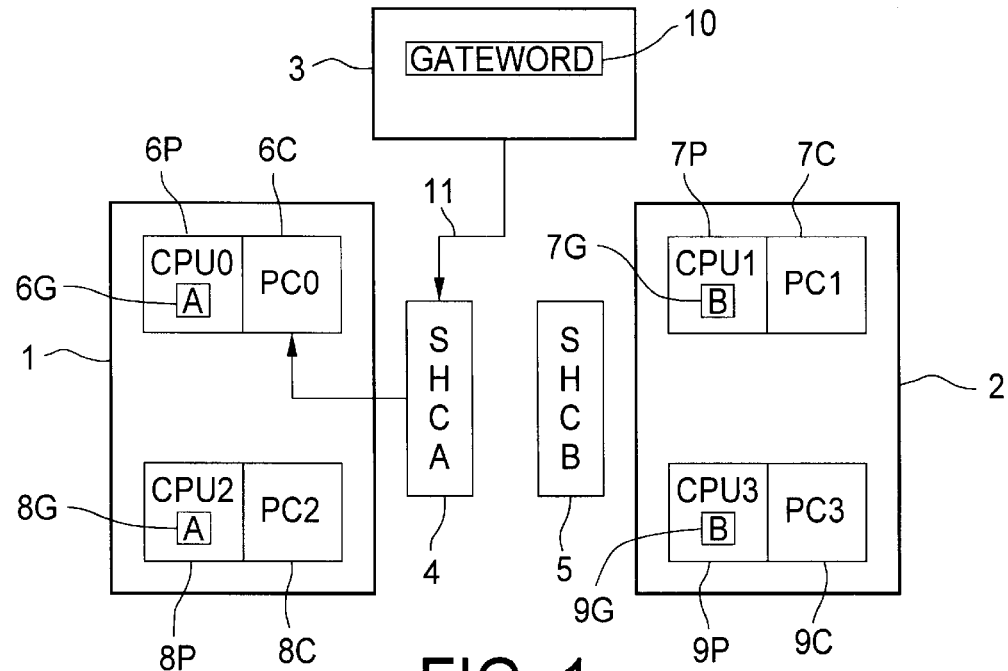
FIG. 1 is a block diagram of a simplified exemplary multiprocessor system showing a first condition in which a first processor obtains ownership of a gateword stored in a memory.

In the exemplary embodiment chosen to describe the invention and with reference to FIGS. 1–6, two processor pairs 6P, 8P and 7P, 9P are respectively depicted on two circuit boards 1, 2 with first level private caches 6C, 8C, 7C, 9C and second level shared caches (shared cache 4 serving private caches 6C, 8C) and (shared cache 5 serving private caches 7C, 9C) to emphasize the delays incurred with a write-into-cache hardware architecture. (As a practical matter, shared caches are typically disposed on the same board as the processors it serves.) The term "write-into-cache" defines a caching process that saves time by not routinely sending newly written data words to the main memory 3. As will be discussed further below, each CPU includes a hardware anti-hogging flag and suitable means to carry out delays such as a decrementable register.

In a write-into-cache environment, a newly written word is retained within the private cache of the processor that wrote it, and this is the only valid copy of the word in the memory hierarchy. All outdated copies in other processors are invalidated when the write occurs. A copy of the newly written word can be obtained by any processor using a read and siphon process. This will change the status of all copies of the newly written word from "valid, modified and owned by the processor" to "valid and modified" or "valid" depending on which board siphoned the word. "Modified" indicates that the main memory 3 does not yet have a valid copy. Main memory 3 will be routinely over-written with the modified copy, and thus updated, when the word needs to be displaced for new incoming data by a swapping operation. The foregoing description sets forth the hardware environment that the special gateword handling mechanism described herein will improve.

When hogging occurs, only the process attempting to access a gateword can detect it with the use of system timers or counters. In the present invention, rather than abort or tie up a processor waiting for gate access, the first of two new instructions is used to notify the other processors when a software process has reached an unacceptable wait time for access to a gate. That is, the new instruction allows software to broadcast notification from a given processor that it is in trouble and needs the gate before it has no option but to abort its current process.

This first new instruction should have some particular characteristics. It must bypass the memory hierarchy so that it will have no impact or be held up by any of the caching mechanisms being used at the time of execution. It therefore will not create it's own hogging since it bypasses bus priorities and the use of any memory data. The instruction should only be issued when required in order that delays are not unnecessarily introduced. The instruction need not be applied to all gateword procedures, but only to heavily used gates that exhibit a problem. In the present invention, this first new instruction sets hardware gate control flags 6G, 7G, 8G, 9G in all processors. For illustrative purposes, this first new instruction is called "SGCF" (set gate control flag) herein.

The responsibility for resetting any gate control flag is not left to the process that broadcast the SGCF command. To facilitate the reset of the gate control flags and provide a fixed time period for waiting, an optional second new instruction tests the gate control flag and waits a predetermined time (by, for example, counting down a preset register). Thus, when this second new instruction, illustratively "RGCF" (reset gate control flag), executes in a given processor, it resets its gate control flag and counts down its internal register before exiting.

However, it will be understood that resetting the flag does not require the RGCF instruction or memory access. The processor issuing the SGCF instruction preloads its internal register, used by the internal "wait" routine with a very small count while the other processors, detecting the gate control flag being set using the SGCF instruction, will load a very large count. As a result, the process that needs a gateword can immediately attempt to acquire it while the other processors will be delayed in attempting to acquire the gateword.

The proper delays (governed by the observed delays in a given hardware implementation) allow the requesting processor to siphon the gateword and test it without interference. Once the requesting processor finds the gateword open, it will carry out the relevant operation. The processors in conflict will reset their gate control flags, complete the delay time and then continue. This procedure may continue forcing the gateword back and forth as needed.

The hogging problem can be totally averted without otherwise affecting system performance through the use of the present invention. The hardware gate control flag in each processor is not used by any other instruction such that it has no impact on current instructions. Software has the ability to reset the hardware gate control flag by simply issuing an RGCF instruction in each processor. This will allow a clean start in recovery situations. (The broadcast SGCF instruction can be implemented with an automatic flag reset option to reset all gate control flags in the system from a single processor. Suitable provision must be made to accomplish this step.)

Reference to FIGS. 1–6 serves to clarify the operation of the invention. These FIGs. depict conditions which cause hogging and also, by the use of the present invention, how to avoid hogging without incurring software overhead or implementing a queue of addresses or processor numbers.

It will be understood that software has total control to implement the invention in any gateword routine. It does not have to be implemented in gate routines having no impact if not used. It is not important that the mechanism know the address of the gateword or the processor numbers in conflict. The fact that sufficient processors are in conflict while attempting to gain access to the same gateword dictates that at least three processors are trying to acquire the same gateword at some address. It is not important to know which processors are in conflict. It could be all processors or a minimum of three. The first processor to have a problem accessing a gateword will set the gate control flags (broadcast SGCF) in all processors and therefore establish its priority as the first to have a gate access problem. When the other processors enter a common gate routine (one containing a gate wait process), the RGCF instruction will detect the flag, reset it and delay within the RGCF instruction until the count runs down.

The gate control flag will not be reset immediately in those processors not in conflict (i.e., those processors not attempting to access the gateword). However, the processor (s) causing the problem will reset their flags and delay within the "wait" instruction (RCGF) allowing the gateword to be siphoned to the processor in need. Any processors not in conflict will eventually execute a common gate routine containing a "wait" instruction (RGCF) and will reset their gate control flags. Once the gate control flag is set, it will cause that processor to be delayed when the next "wait" (RGCF) instruction is encountered. Only those gates programmed with the "wait" instruction (RGCF) will experience any delay.

Referring particularly to FIG. 1, a potential hogging conflict starts when a first processor 6P establishes ownership of a gateword 10 from memory 3 via a system bus 11 by doing a conventional read-alter-rewrite to acquire the gateword which cannot later be acquired from memory 3 as long as there is ongoing competition for the process or data whose usage is controlled by the given gateword. (The gateword is usually found first in main memory 3 as depicted in a set of circumstances leading to hogging.) The processor 6P test the gateword, now resident in its private cache 6C, and, if allowed (not marked as already in use by another processor), will execute gated common code or use gated shared data.

Figure 2:
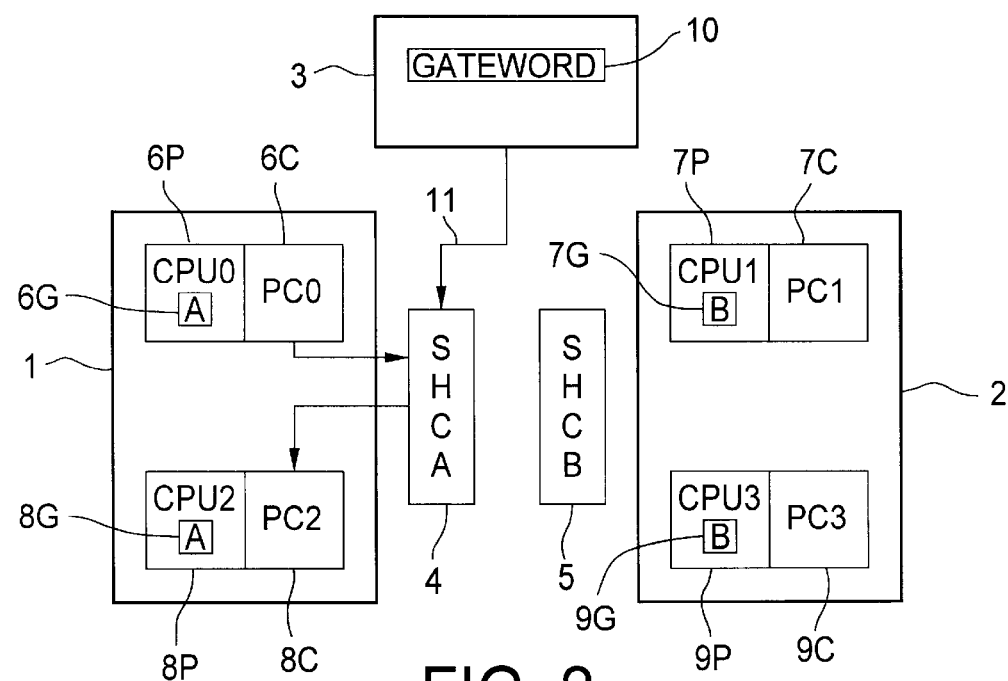
FIG. 2 is a block diagram of the exemplary multiprocessor system showing a second condition in which second processor on the same circuit board as the first processor is seeking ownership of the gateword.

Thus, in FIG. 2, the first processor 6P (CPU0) has acquired ownership of the given gateword; it has the only valid copy of the gateword, in the entire memory hierarchy system, in its private cache 6C. The shared (second level) cache 4 also has a copy, but it is marked as owned by processor 6P. The shared cache serves to speed up data access by the other processors in the system. The processor 6P is executing/using the protected code/data for which it has closed the gate control word by writing the word with a closed data pattern.

Consider that processor 8P (processor CPU2) wants to access the same code/data; it must first read and test the current gateword. To gain access, it will siphon the gateword from the shared cache 4 and test it. It now has a read copy, and the processor 6P is no longer the only owner. The status has been changed for the gateword in the private cache 6C, shared cache 4 and private cache 8C copies to "valid, modified and owned" by CPU2 8P. But, the processor 8P cannot yet use the protected code/data, so it loops on testing the valid copy it retains in its private cache, PC2. The status won't change until the processor 6P exits the protected code/data and writes the gateword "open" allowing use of the code by another processor. Processor 8P (CPU2) can gain access to the gateword simply by reading a copy from shared cache 4 into its private cache 8C. The access path has very short delays because there is no need to pass information across the system bus 11, just an internal bus on the board 1 which typically also incorporates the shared cache 4. However, the shared cache 4 is shown in the FIGs. just off the board to illustrate the principles of the invention.

Figure 3:
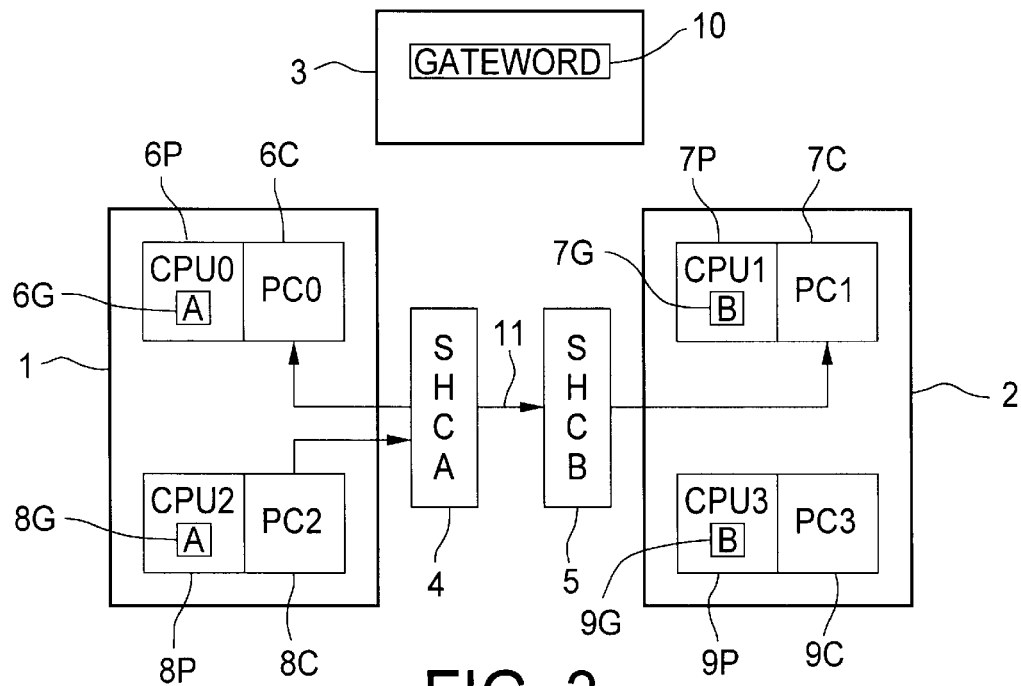
FIG. 3 is a block diagram of the exemplary multiprocessor system showing a third condition in which processors on different circuit boards are contending for ownership of the gateword.

In FIG. 3: the first processor CPU0 6P is still using the protected code/data. CPU2 8P is continuing to test the gateword while waiting for it to allow use of the protected code/data. Now CPU1 7P on board 2 also needs access to this heavily used gateword. Its access path for getting the gateword for testing requires a much longer delay. It must siphon the data from shared cache (SHCA) 4, through shared cache (SCHB) 5 via system bus 11, while competing with any other system bus activity, then through its own private cache PC1 7C for testing in CPU1. After the first read, the gateword copy has been placed in processor CPU1 7P and SCHB 5 and changes status to "valid, modified and owned" by CPU1. CPU1 will just loop reading it's own copy. At this point, the gate control word is still marked closed since CPU0 has not finished the gated code/data.

When CPU0 6P finally finishes using the protected code/ data, it will write the gateword with an open data pattern. The gateword is siphoned back to CPU0 6P, and a conventional "cache invalidate" command is sent to all processors when this write occurs. The copies in all shared caches and other processors are invalidated.

At this point CPU0 6P has the only updated copy of the gateword in its private cache. Now the hogging begins. Both CPU2 8P and CPU1 7P try to acquire the gateword. Because CPU2 can siphon the word from CPU0 on the internal bus of the board 1 without going to the system bus 11 while CPU1's attempted siphon must go through two shared cache interface mechanisms of both shared caches 4, 5, CPU2 will always win. It will test the gateword, find it open and close it before CPU1 can get a read copy to test. Typically with heavily used gates, CPU0 will be soon be trying to acquire the same gateword again in competition with CPU1, and it will win again because of CPU1's handicap in the process. So it continues until CPU1 is interrupted on its run timer, or aborts the process that needs the gate or perhaps one of the other processes finishes and a new one doesn't use the same gate so that CPU1 finally is able to access the code/data. The foregoing demonstrates the hogging problem. Now, it will be shown how the present invention prevents hogging.

Figure 4:
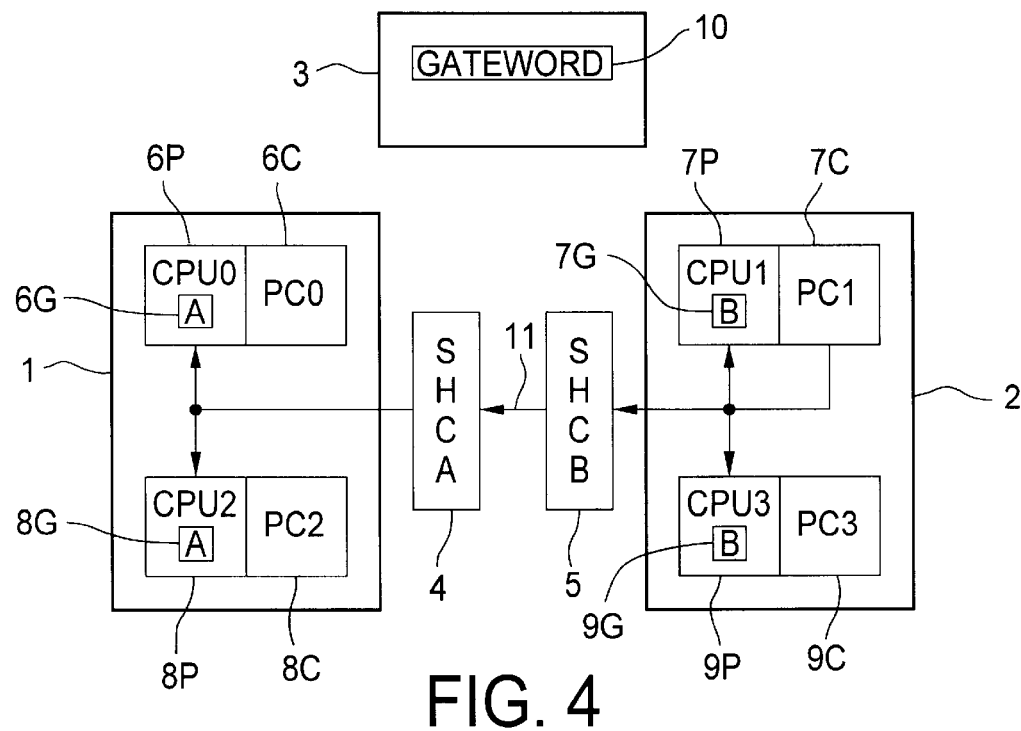
FIG. 4 is a block diagram of the exemplary multiprocessor system showing a fourth condition in which a first instruction used in the invention has been broadcast to all processors from a processor in danger of aborting because it cannot obtain ownership of the gateword through routine competition because of circuit delays.

In FIG. 4, CPU1 7P finds that it cannot acquire the gateword after trying for some unacceptable time. It will then issue the "wait" instruction and broadcast the SGCF command on the system bus 11 to set the hardware gate flags 6G, 7G, 8G, 9G in all processors including the issuing processor. This system bus command will bypass all memory hierarchy since it does not reference any memory location. It passes directly through all caches with no effect on the cache data sequence existing at the time it is issued.

Figure 5:
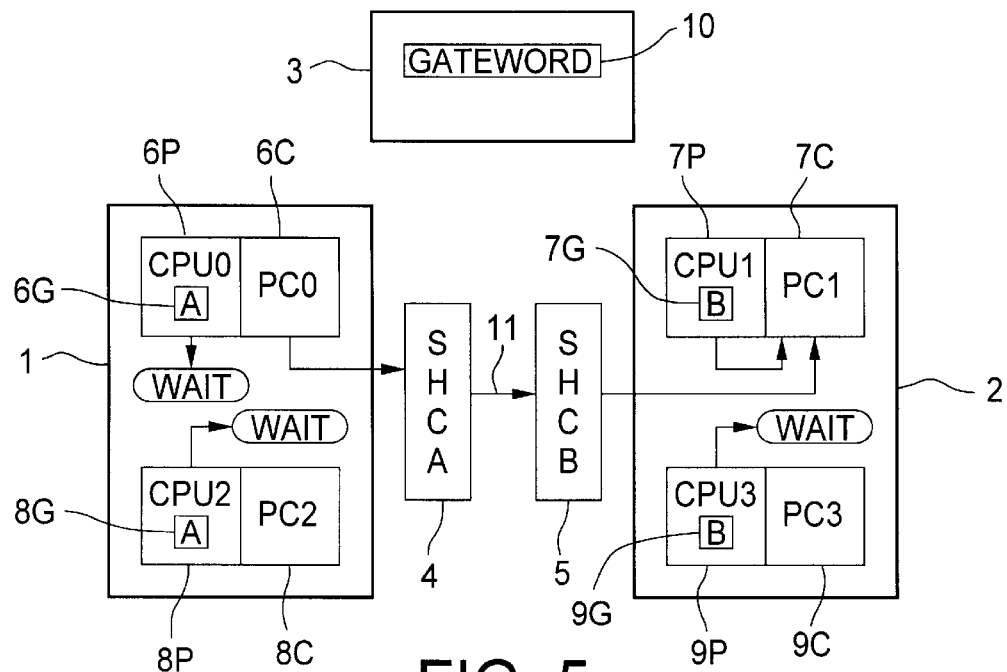
FIG. 5 is a block diagram of the exemplary multiprocessor system showing a fifth condition in which all processors except the processor which broadcast the first instruction are waiting before any attempt to obtain ownership of the gateword.

In FIG. 5, if software has coded in the "test wait" instruction (RGCF) and preloaded the wait count, all the processors in conflict will wait a predetermined count before trying to read the gateword again. CPU1 7P will not wait (or will wait only for a very short period) because it was the processor that broadcast the SGCF instruction. CPU1 will take a different code path to acquire the gateword from CPU0. After CPU0 finished using the protected code/data, it opened the gateword such that CPU1 can acquire it. CPU1 will be unimpeded by other processors in accessing the gateword and gaining control over the code/data because CPU0 and CPU2 are both waiting.

It is important to observe that most common code is very short since it is inhibited from getting interrupts and therefore has a specific amount of runtime which can be calculated within reason. The fact that gated routine execution time can be measured provides the software developers with the ability to predetermine the amount of delay required from the point the hardware gate flag is detected.

Because CPU1 does not use the RGCF instruction, its gate control flag 7G remains set. It will require resetting. This can be done in the SGCF instruction by looping within the instruction until the flag sets, then resetting it or just allow it to reset on the next common gate routine containing a "wait" instruction.

Figure 6:
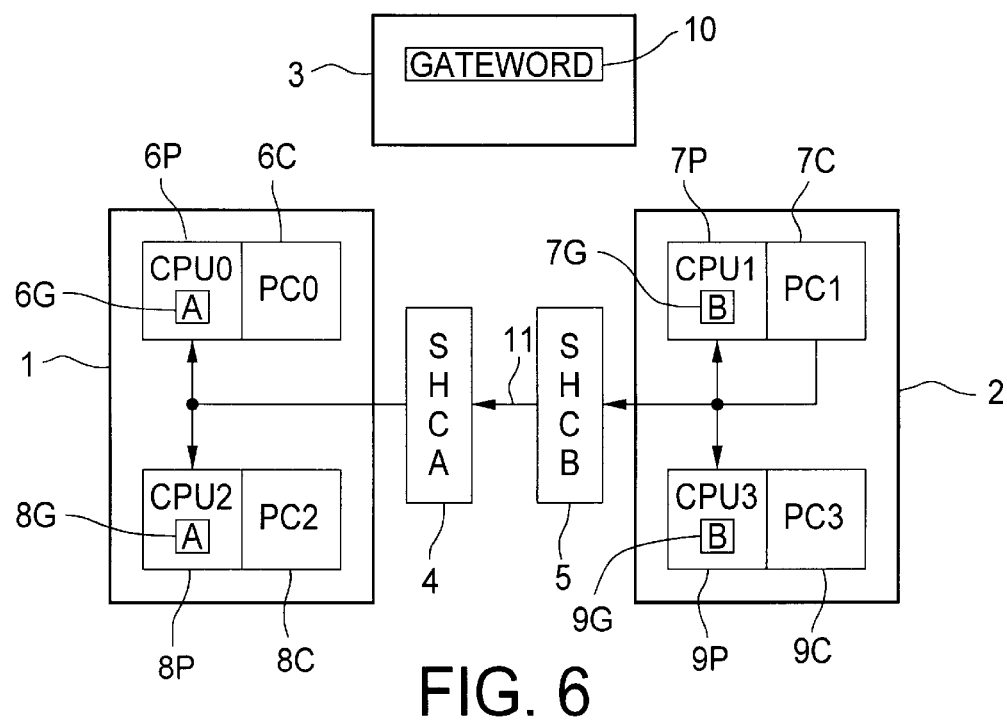
FIG. 6 is a block diagram of the exemplary multiprocessor system showing a sixth condition in which a second instruction has been broadcast from the processor which broadcast the first instruction after it has successfully obtained ownership of the gateword, the second instruction terminating the wait states in all processors.

FIG. 6 illustrates an optional feature which makes the invention more efficient by employing a broadcast reset gate control flags "RGCF" instruction to all processors. This minimizes the delay times in processors not involved with the conflict by resetting all gate control flags as soon as the gateword is acquired by the processor which invoked the SGCF command.

While the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A multiprocessor data processing system comprising:
   A) a memory;
   B) at least first and second shared caches;
   C) a system bus coupling said memory and said first and second shared caches;
   D) at least first, second, third and fourth processors having, respectively first, second, third and fourth private caches;
   E) said first and second private caches being coupled to said first shared cache, and said third and fourth private caches being coupled to said second shared cache;
   F) a gate control flag incorporated into each of said first, second, third and fourth processors;
   H) a gate control word initially stored in said memory, the gate control word governing access to common code/data shared by processes running in at least three of said processors;
   I) means for one processor to acquire ownership of the gate control word and for preventing other processors from acquiring ownership thereof until said one processor has completed use of the governed code/data; and
   J) means for another processor to establish priority for next acquiring ownership of the gate control word comprising:
      1) means for said another processor to broadcast a set gate control flag command to all processors, setting the gate control flags establishing delays during which ownership of the gate control word will not be requested by a processor for predetermined periods established in each processor; and
      2) means in said another processor to establish a shorter predetermined period than established in all other processors;
   whereby, said another processor will acquire ownership of the gate control word when said one processor relinquishes ownership thereof.

2. The multiprocessor data processing system of claim 1 in which a process running in said another processor determines that it may have to abort if it cannot have access to the code/data governed by the gate control word and, in response to such determination, causes said another processor to broadcast the set gate control flag command.

3. The multiprocessor data processing system of claim 2 in which said one processor and said another processor are coupled to different shared caches.

4. The multiprocessor data processing system of claim 3 in which said another processor is not able to acquire ownership of the gate control word without broadcasting the set gate control flag command to all processors because a third processor coupled to the same shared cache as said one processor is competing for ownership of the gate control word and will normally prevail because of signal delays across said first and second caches experienced by said another processor.

5. The multiprocessor data processing system of claim 1 in which said another processor broadcasts a reset gate control flag command to all processors when it has acquired ownership of the gate control word.

6. The multiprocessor data processing system of claim 2 in which said another processor broadcasts a reset gate control flag command to all processors when it has acquired ownership of the gate control word.

7. The multiprocessor data processing system of claim 3 in which said another processor broadcasts a reset gate control flag command to all processors when it has acquired ownership of the gate control word.

8. The multiprocessor data processing system of claim 4 in which said another processor broadcasts a reset gate control flag command to all processors when it has acquired ownership of the gate control word.

9. In a multiprocessor data processing system including: a memory; at least first and second shared caches; a system bus coupling the memory and the first and second shared caches; at least first, second, third and fourth processors having, respectively first, second, third and fourth private caches with the first and second private caches being coupled to the first shared cache, and the third and fourth private caches being coupled to the second shared cache; a method for preventing hogging of ownership of a gate control word which govern access to common code/data shared by processes running in at least three of the processors; the method comprising:
   A) incorporating a gate control flag into each of the first, second, third and fourth processors;
   B) providing means for one processor to acquire ownership of the gate control word and for preventing other processors from acquiring ownership thereof until the one processor has completed use of the governed code/data; and
   C) establishing priority for another processor to next acquire ownership of the gate control word by:
      1) broadcasting from the another processor a set gate control flag command to all processors such that setting the gate control flags establishes delays during which ownership of the gate control word will not be requested by a processor for predetermined periods established in each processor; and
      2) establishing in the another processor a shorter predetermined period than established in all other processors;
   whereby, the another processor will acquire ownership of the gate control word when the one processor relinquishes ownership thereof.

10. The method of claim 9 in which a process running in said the processor determines that it may have to abort if it cannot have access to the code/data governed by the gate control word and, in response to such determination, causes said another processor to broadcast the set gate control flag command.

11. The method of claim 10 in which the one processor and the another processor are coupled to different shared caches.

12. The method of claim 11 in which the another processor is not able to acquire ownership of the gate control word without broadcasting the set gate control flag command to all processors because a third processor coupled to the same shared cache as the one processor is competing for ownership of the gate control word and will normally prevail because of signal delays across the first and second caches experienced by the another processor.

13. The method of claim 9 in which the another processor broadcasts a reset gate control flag command to all processors when it has acquired ownership of the gate control word.

14. The method of claim 10 in which the another processor broadcasts a reset gate control flag command to all processors when it has acquired ownership of the gate control word.

15. The method of claim 11 in which the another processor broadcasts a reset gate control flag command to all processors when it has acquired ownership of the gate control word.

16. The method of claim 12 in which the another processor broadcasts a reset gate control flag command to all processors when it has acquired ownership of the gate control word.

* * * * *